United States Patent [19]

Staehler et al.

[11] Patent Number: 5,443,773

[45] Date of Patent: Aug. 22, 1995

[54] PROCESS FOR PRODUCING HIGH STRENGTH ALUMINA

[75] Inventors: James M. Staehler; William W. Predebon; Bruce J. Pletka, all of Houghton, Mich.

[73] Assignee: Board of Control of Michigan Technological University, Houghton, Mich.

[21] Appl. No.: 212,158

[22] Filed: Mar. 14, 1994

Related U.S. Application Data

[62] Division of Ser. No. 970,615, Nov. 3, 1992, Pat. No. 5,352,643.

[51] Int. Cl.⁶ .............................................. B28B 3/00
[52] U.S. Cl. ...................................... 264/102; 264/125
[58] Field of Search .................. 264/1.2, 65, 102, 125; 501/127

[56] References Cited

U.S. PATENT DOCUMENTS 5,081,082  1/1992  Hai-Doo et al. ................... 501/153
5,242,298  9/1993  Sernetz ................................ 433/2

Primary Examiner—Christopher A. Fiorilla
Attorney, Agent, or Firm—Michael, Best & Friedrich

[57] ABSTRACT

A vacuum hot pressed alumina material having small, isometric grains; a uniform distribution thereof; relatively low, predominantly transgranular porosity; and a density approaching the theoretical density of pure alumina produced by vacuum hot pressing alumina powder which contains at least 98.0% alumina, is substantially free of any sintering aids or any other additives, and has a median particle size less than about 3 microns, in a vacuum hot press operated at a temperature of at least about 1350° C. and a pressure of at least 28 MPa (3500 PSI) for a sintering period of at least 1.5 hours. The vacuum hot pressed alumina material also has compressive strength, flexural strength, impact strength, and wear resistance superior to that for most conventional sintered alumina materials.

36 Claims, 2 Drawing Sheets

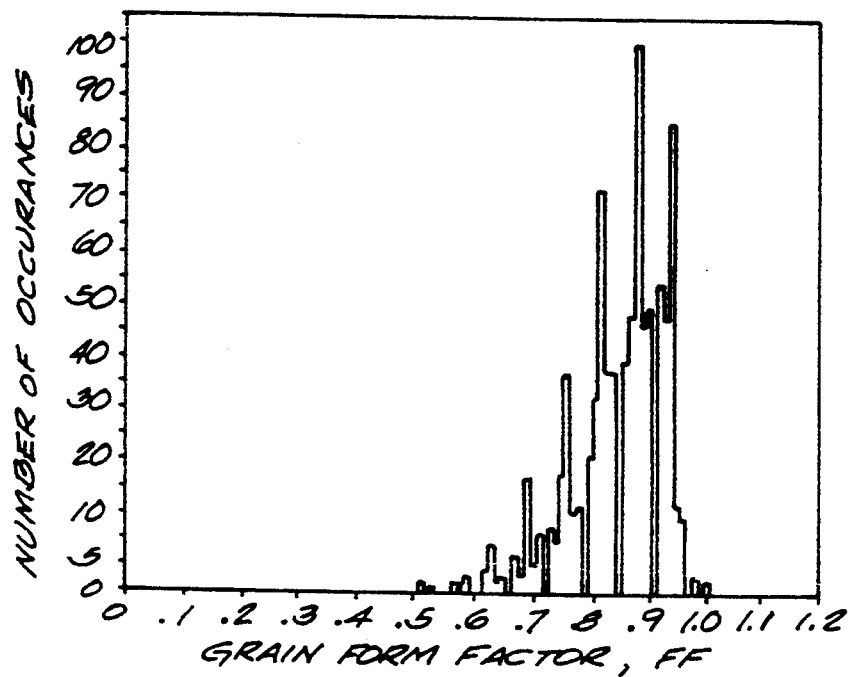

PROCESS FOR PRODUCING HIGH STRENGTH ALUMINA

This is a division of application Ser. No. 07/970,615, filed Nov. 3, 1992 now U.S. Pat. No. 5,352,643.

BACKGROUND OF THE INVENTION

I. Field of the Invention

This invention relates to high strength alumina materials and processes for producing the same.

II. Description of the Prior Art

Alumina, or aluminum oxide ($Al_2O_3$), is a commonly used ceramic material. It may be useful in applications where light, high strength material is required. For example, it may be useful for making high strength parts, tools, armor and implants. It is usually desirable in such applications to utilize materials having high compressive strength, flexure strength, impact strength and wear resistance.

Alumina powders used to make alumina materials typically include an appreciable amount of other materials, For example, Ceraver, a brand of commercially available alumina material, is only 92% alumina. Ordinarily, the presence of such impurities adversely affects the physical properties of the alumina material.

The formation of ceramic materials from alumina powder typically requires processing at elevated temperatures. An undesirable effect of such processing is that grains may grow to large, widely distributed sizes. Similarly, such grains may be irregularly shaped. Therefore, sintering agents, such as MgO, are typically added to the alumina powder to control the growth of such grains. However, addition of such sintering agents has the undesirable effect of introducing materials other than alumina into the material so formed. The final material formed by such a process usually includes a glassy phase. This glass phase introduces "weak" areas between the grain boundaries of the sintered material. Therefore, it is desirable to avoid the addition of sintering agents.

During formation of $Al_2O_3$ powder into high strength materials, the resulting material will have various microstructures, depending upon the particular processing techniques, conditions and materials employed. It is desirable to control the microstructure formed during processing, so as to produce materials with desirable properties. For example, it is usually desired to produce a material with small grains, and a uniform distribution of grain sizes, because such grain characteristics are commonly associated with high strength.

Similarly, it is desirable to produce an alumina material with uniform, equiaxed, isometric grains, because such grains are commonly associated with high strength. This property maybe measured by a Form Factor, defined as follows:

$$FF = 4\pi A/P^2$$

where

P = grain perimeter; and
A = cross-sectional area of the grain. A perfectly circular grain would have a form factor of 1.0. Ideal, high density, equiaxed grained ceramic materials in two dimensions, like alumina, can be expected to have six neighboring grains. The theoretical form factor for such structures is 0.91.

It is desirable to produce a material with low porosity, because such low porosity is commonly associated with high strength. It may be desirable to produce a material with predominantly transgranular porosity, rather than intergranular porosity, because such predominantly transgranular porosity may be less detrimental to its strength properties. Transgranular porosity is a characteristic wherein void spaces are contained within individual grains themselves, rather than being located at grain boundaries. Intergranular porosity is a characteristic wherein void spaces are located on grain boundaries, rather than within individual grains.

SUMMARY OF THE INVENTION

An object of the invention is to provide a process for producing high strength alumina or ceramic materials from alumina and the ceramic materials produced thereby.

Another object of the invention is to provide such a process which is capable of producing desirable grain structure without the addition of sintering agents.

Another object of the invention is to provide a high strength alumina material having small, isometric grains; a substantially uniform grain distribution; substantially low, predominantly transgranular porosity; and a density approaching the theoretical density of pure alumina.

Another object of the invention is to provide such an alumina material having a compressive strength and Young's modulus substantially higher than conventional sintered alumina materials.

Another object of the invention is to provide such an alumina material also having high flexural strength.

Another object of the invention is to provide such an alumina material also having high impact strength.

Another object of the invention is to provide such an alumina material also having high wear resistance.

Other objects, aspects and advantages of the invention will become apparent to those skilled in the art upon reviewing the following description and claims.

The invention provides a vacuum hot pressed alumina material having one or more of the following characteristics: (1) compressive fracture strength greater than about 4,400 MPa at a strain rate of $10^{-4}s^{-1}$, (2) compressive fracture strength greater than about 6,700 MPa at a strain rate of $10^3 s^{-1}$, (3) mean grain size less than about 3.0 microns, (4) mean form factor greater than about 0.75, (5) spall strength greater than abut 0.75 GPa, (6) flexural strength greater than about 780 MPa, and (7) Young's modulus greater than about 350 GPa.

The invention also provides a method for producing such a high strength alumina material by vacuum hot pressing an alumina powder which contains at least about 98% alumina, is substantially free of sintering agents, and has a median particle size less than about 3 microns in a vacuum hot press and operating said vacuum hot press at a temperature greater than about 1350° C. but below that temperature which can cause substantial grain growth, at a die pressure greater than about 24 MPa (3500 PSI), and for a period greater than about 1.5 hours but shorter than that which can cause substantial grain growth.

The uniformity of the density throughout the material can be enhanced by treating the material in a hot isostatic press operated at a pressure, at a temperature, and for a time period sufficient to obtain substantially consistent densification throughout said alumina material, but below a temperature and for a shorter period than that which can cause substantial grain growth, and under an inert gas atmosphere.

DESCRIPTION OF THE DRAWINGS

FIG. 3 is a plot of the form factor distribution for a alumina material of the invention.

DESCRIPTION OF THE PREFERRED EMBODIMENT

Figure 1:
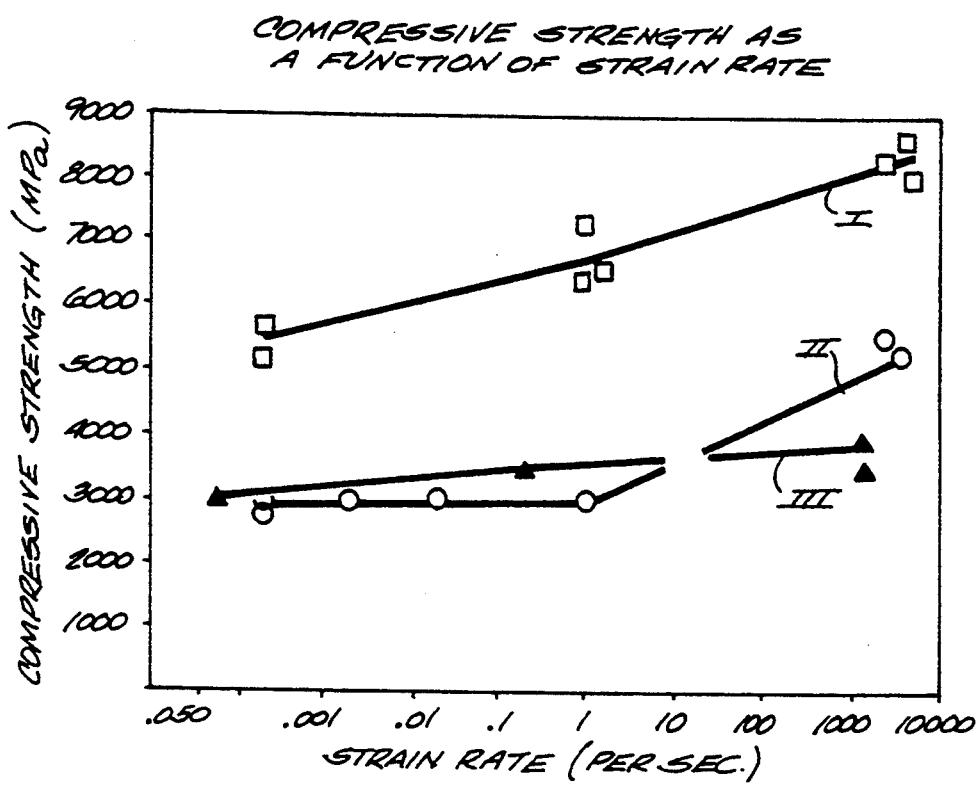
FIG. 1 is a plot of compressive strength as a function of strain rate for alumina material, comparing the vacuum hot pressed alumina material of the invention with two conventional sintered alumina materials.

The preferred starting material is a high purity alumina powder, containing at least about 98.0%, and preferably at least about 99.5%, more preferably at least about 99.9%, and most preferably at least abut 99.99% $Al_2O_3$ and having a median particle size of less than about 3 microns, preferably less than abut 2 microns, and most preferably less than about 0.58 microns with 100% being less than about 6 microns. The alumina powder may be of any phase, and preferably is alpha phase. It is important to not add sintering agents to the powder, because of the adverse affects they can have on the strength characteristics of the final material.

In order to remove organic contaminants, the powder preferably is calcined in a suitable manner. For example, it may be calcined in air at a temperature of about 650° C. for about 1 to about 1.5 hours in high purity alumina crucibles. After cooling, any agglomerates formed during calcining are broken up into the desired particle size for the starting material. This can be accomplished using a high purity alumina mortar and pestle, or by ultrasonication techniques.

The powder is processed in a vacuum hot press, such as a vacuum hot press with a floating die. A floating die with high purity graphite walls and punches can be used. With such a press, two sacrificial graphite disks of the same diameter as the die cavity and punches, may be used as an interface between the alumina and the die punches. Such disks protect the die punches and hold the powder in the die. The surfaces of the disks that will contact the alumina preferably are coated with a material which will prevent the alumina from fusing with the graphite during pressing. For example, the coating may be a zirconia paint which is thermally cured.

Prior to loading the powder into the die, the internal die walls should be cleaned of any loose graphite, as by wiping. One of the sacrificial graphite disks should be placed in the die with the coated surface facing toward the region where the powder will rest. To prevent contamination of the powder with graphite while loading, the powder may be poured through a large diameter funnel fitting inside the die cavity. The funnel spout may be positioned at the bottom of the cavity and slowly removed to disperse powder into the cavity. The second sacrificial disk should then be positioned, with the coated surface facing the top surface of the powder. Hand or mechanical pressure up to about 2 MPa should be applied to compact the powder and hold it in the die.

The powder should be compacted further prior to the heatup for the vacuum hot press cycle. A typical pressure in such pressing is about 12 MPa (1700 PSI), applied for approximately 2 minutes. Pressure is typically removed during heatup if it is desired not to conform the material closely to the die, enabling easy removal of the material from the die.

A variation of the process described above in which no pressure is applied during heatup is to apply mechanical pressure of about 12 MPa (1700 PSI) to the powder for approximately 2 minutes when the chamber temperature reaches approximately 1000° C. Pressure is then removed during the remainder of the heatup period, until reaching the desired vacuum hot pressing temperature. Then pressure is applied at the desired level for vacuum hot pressing. This variation seems to produce a material with greater shrinkage of the outer radius so that little of the material contacts the die wall upon completion of vacuum hot pressing. This makes extraction from the die easier.

The chamber is evacuated to a pressure within the range of at least about $10^{-2}$ to $10^{-4}$ torr, and preferably in at least the $10^{-4}$ to $10^{-6}$ torr range prior to heatup. This may be accomplished by rough pumping for approximately 8 to 12 hours, followed by diffusion pumping for approximately 1 to 2 hours.

Combinations of vacuum hot pressing temperature, pressure and time parameters may be dependent upon mechanical limitations, such as the length to diameter ratio, of the die. The following parameters were developed for a die producing a 51 mm (2") diameter by about 6.5 mm to 8 mm ($\frac{1}{4}$" to 5/16") thick piece of alumina material from abut 60 grams of alumina powder.

Vacuum hot pressing occurs at a temperature of at least about 1350° C., but below a temperature which can cause substantial grain growth. Temperatures in excess of about 1500° C. should be avoided. The vacuum hot pressing temperature preferably is about 1375° to about 1425° C., and most preferably about 1400° C. The temperature of the vacuum chamber should be incrementally raised as rapidly as possible to minimize grain growth, but below a rate which can cause thermal shock. For example, the chamber temperature can be incrementally raised to approximately 1400° C. at a rate of approximately 50° C. per 5 minutes. After the chamber temperature reaches the desired level, a waiting period of approximately 20 to 30 minutes before pressing is desirable to ensure heating of the die mass and powder.

The vacuum hot press is operated to apply pressure to the partially compacted powder of at least 24 MPa (3500 PSI), more preferably 28 MPa (4000 PSI), more preferably 31 MPa (4500 PSI), and most preferably at least 34.5 MPa (5000 PSI). During such pressing, the vacuum chamber is maintained at a vacuum within the range of at least about $10^{-2}$ to $10^{-4}$ torr, and preferably in the range of at least about $10^{-4}$ to $10^{-6}$ torr.

The above pressure and temperature conditions are maintained for a period sufficient to process the powder, but shorter than that which can cause appreciable grain growth. This time preferably is about 1.5 to about 3.0 hours, preferably about 2.0 hours, and most preferably about 2.5 hours.

Following vacuum hot pressing, the furnace temperature preferably is raised approximately 40° to 50° C. to expand the die, aiding removal of the alumina material from the die. Pressure is removed from one side of the die so that the material can be removed or partially removed from the die. Low pressure and slow removal should be employed to avoid scoring the die wall.

The vacuum hot pressed material may be treated in a hot isostatic press to obtain more uniform densification throughout the material. Suitable conditions of operation are interdependent and nonlinear, but the hot isostatic press must be operated under conditions which will not cause substantial grain growth. For example, the hot isostatic press can be operated at a pressure of at least about 103 MPa (15,000 PSI), preferably at least about 138 MPa (29,000 PSI), and most preferably at least about 172 MPa (25,009 PSI); at a temperature of about 1209° C. to about 1450° C., preferably about 1275° C. to about 1400° C., and most preferably about 1300° C.; and for about 1.0 hours to about 3.0 hours, preferably about 1.5 hours to about 2.25 hours, and most preferably about 2.0 hours. The hot isostatic press preferably is operated under a high purity inert gas atmosphere (e.g. argon). Heatup and cooling of the hot isostatic press is done incrementally, for example, at a rate of about 43° C. per minute.

A vacuum hot pressed alumina material of the invention has one or more of the following characteristics: (1) compressive fracture strength of at least about 4,400 MPa, can be at least as high as about 5,100 MPa, and even at least as high as about 5,566 MPa at a strain rate of $10^{-4}$ sec$^{-1}$, (2) compressive fracture strength of at least about 6,700 MPa, can be at least as high as about 7,800 MPa, and even at least as high as about 8,400 MPa at a strain rate of $10^{-3}$ sec$^{-1}$, (3) mean grain size less than at least about 3 microns, can be less than at least about 2.0 microns, and even as low as at least about 1.5 microns, (4) mean form factor greater than at least about 0.75, can be at least as high as about 0.80, and even at least as high as about 0.86, (5) spall strength greater than at least about 0.75 GPa, can be greater than at least about 1.0 GPa, and even at least as high as about 1.2 GPa, (6) flexural strength greater than at least about 780 MPa, and even greater than at least about 908 MPa, and (7) Young's modulus greater then at least about 350 GPa, and even greater than at least about 400 GPa. A material of the invention has very high wear resistance and also relatively low, predominantly transgranular porosity.

These properties make the material of the invention capable of being used in, for example, cutting tools, armor, implants and high strength parts.

The following example is presented to illustrate a preferred embodiment of the invention and should not be construed as a limitation thereto.

EXAMPLE

Samples of vacuum hot pressed alumina material were prepared according to the preferred embodiment of the process described above. The alumina powder used for a starting material was CR6-2 alumina powder marketed by Baikowski Int. Corp., Charlotte, N.C., which contains 99.99% alumina and has a median particle size of 0.52 microns. Sintering aids or any other materials were not added to the powder. Approximately 60 grams of powder was used to produce a disk of about 51 nun (2") diameter by about 6.5 mm to 8 mm ($\frac{1}{4}$" to 5/16") thick. The alumina powder was calcined in air at 650° C. for 1.0 to 1.5 hours in high purity alumina crucibles to remove combustible organic contaminants, and soft agglomerates were broken up with a high purity alumina mortar and pestle. The powder was loaded into the cavity of a floating die having graphite walls and punches and being free of graphite powder, with two thin sacrificial graphite disks coated with zirconia paint placed between the powder and the punches. The powder was cold pressed in the die at about 2 MPa (280 PSI) to hold it in the die during positioning in the chamber of a vacuum hot press. The chamber was evacuated to a pressure in the range of about $10^{-5}$ to $10^{-6}$ torr. The powder was then cold pressed for about two minutes at about 12 MPa (1700 PSI). Then, the chamber temperature was raised to about 1400° C. at an incremental heatup rate of about 50° C. per 5 minutes. The previously compacted powder was then vacuum hot pressed in the floating die in the chamber of the vacuum hot press under 34.5 MPa (5000 PSI) applied for about 2.5 hours at 1400° C. and at a chamber pressure remaining about $10^{-4}$ to $10^{-6}$ torr. The samples from the vacuum hot press were further treated in a hot isostatic press under 172 MPa (25,000 PSI) applied for 2.0 hours at 1300° C. in an argon atmosphere.

Figure 2:
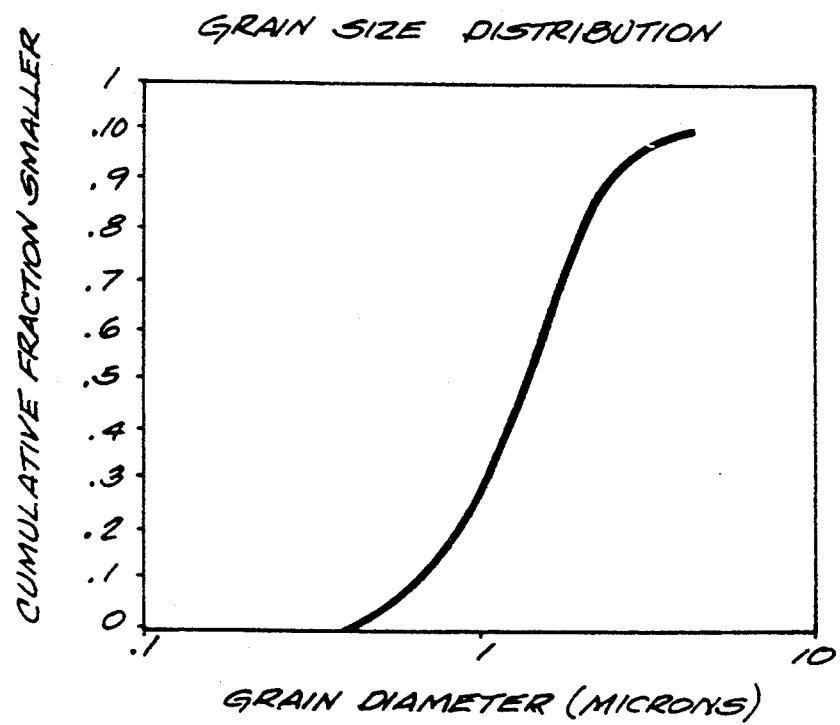
FIG. 2 is a plot of the grain size distribution for a alumina material of the invention.

Samples from the hot isostatic press were polished and thermally etched at 1500° C. for 5 minutes. The corrected mean grain size determined from SEM micrographs of such samples was 1.48 microns. The grain size distribution is shown in FIG. 2. This distribution shows that no grains greater than 5 microns in diameter were formed, and the distribution is uniform around the mean. TEM micrographs revealed that porosity was predominantly transgranular.

The density of samples from the hot isostatic press was measured using the immersion technique in distilled water. The density determined in this manner exceeded 99.5% of the theoretical density of alumina, indicating that the material has relatively low porosity.

Form factors were determined for samples from the hot isostatic press by digitizing grains from SEM micrographs of polished and thermally etched samples. Areas and parameters were calculated for each digitized grain. These were in turn used to calculate the form factor. The distribution of such form factors is shown in FIG. 3. The median form factor was found to be 0.86 and the mean was 0.84. This is close to the theoretically predicted value of 0.91 for a material with uniform six-sided grains, indicating that the grains were predominately isometric.

Samples from the hot isostatic press were tested for compressive strength in tests conducted using right circular cylinders with a length to diameter ratio of 2.0 and ends lubricated with teflon tape. FIG. 1 is a plot of compressive strength as a function of strain rate for a vacuum hot pressed alumina material of the invention and two commercial available alumina materials. The material of the invention is designated as material I in FIG. 1. Material II is Ceraver ® alumina, marketed by ALCOA, which contains 92% alumina and has a mean grain size of 3.73 microns. Material III is Lucalox ® alumina, marketed by General Electric, which contains 99.9% alumina and has a mean grain size of 25 microns.

From the data graphically illustrated in FIG. 1, it can be seen that a material of the invention exhibits significantly higher compressive strength than conventional sintered alumina materials at all strain rates. For example, the compressive fracture strength of a sample of the subject alumina material was at least about 5566 MPa at a strain rate of $10^{-4}$ sec$^{-1}$. This was about 79% higher than the fracture strength of about 3100 MPa of material III at the same strain rate.

Young's modulus was calculated from the slope of the best-fit line through the sample compression strength data. Young's modulus so calculated for a sample of a material of the invention was about 414 GPa.

This is about 33% greater than the 310 GPa Young's modulus calculated from identical tests of material III.

Samples of a material of the invention were also tested for flexural strength in a four-point bend test conducted according to sample style B of MIL-STD-1942. The samples had a mean flexural strength of at least about 908 MPa. This is about 40% greater than the documented strength of commercially available AD999® alumina, marketed by Coors Porcelain Co., Golden, Colo.

A sample of the material from the hot isostatic press was also tested for spall strength using a symmetric impact of 50 mm diameter by 6.2 mm thick targets and 50 mm diameter by 2.8 mm thick impactors and VISAR (Velocity Interferometer System for Any Reflector) technique to measure rear surface velocities. The material so tested exhibited a spall strength of about 1.2 GPa. This is about 140% greater than typical spall strengths of 0.2–0.5 GPa for conventional ceramic materials.

A sample of the material from the hot isostatic press was tested for wear resistance. The test was conducted with a cutting tool employing a vacuum hot pressed alumina material of the invention cutting Inconel 718® material, and compared to a tool having silicon carbide whisker-reinforced alumina also cutting Inconel 718®. The material of the invention, even though it included no reinforcement, demonstrated wear resistance comparable to that for the silicon carbide whisker-reinforced alumina tool.

We claim:

1. A method for producing a high strength alumina material in a vacuum hot press having a chamber including a die cavity comprising the steps of:
   (a) introducing an alumina powder containing at least about 98% alumina, substantially free of sintering agents and organic contaminants, and having a median particle size less than about 3 microns into the die cavity;
   (b) evacuating said chamber; and
   (c) vacuum hot pressing said powder at a temperature greater than about 1350° C. but below that which can cause substantial grain growth, at a die pressure greater than about 24 MPa (3500 PSI), and for a period greater than about 1.5 hours but shorter than that which can cause substantial grain growth to produce a high strength alumina material.

2. A method according to claim 1 further including the step of calcining said powder at a temperature sufficient to remove volatile contaminants prior to step (a).

3. A method according to claim 1 further including the step of introducing said alumina material from step (c) into a hot isostatic press operated at a pressure, at a temperature, and for a time period sufficient to obtain substantially consistent densification throughout said alumina material, but below a temperature and for a shorter period than that which can cause substantial grain growth, and under an inert gas atmosphere.

4. A method according to claim 1 further including the step of introducing said alumina material from step (c) into a hot isostatic press operated at a pressure of at least about 138 MPa (15,000 PSI), at a temperature of about 1200° C. to about 1400° C. but below a temperature which can cause substantial grain growth, for about 1.0 hours to about 3.0 hours but shorter than that which can cause substantial grain growth, and under an inert gas atmosphere.

5. A method according to claim 4 wherein said hot isostatic press is operated at a pressure of at least about 172 MPa (25,000 PSI), at a temperature of about 1300° C., for about 2 hours.

6. A method according to claim 1 wherein said alumina powder is greater than about 99.5% pure.

7. A method according to claim 6 wherein said alumina powder is greater than about 99.90% pure.

8. A method according to claim 7 wherein said alumina powder is greater than about 99.99% pure.

9. A method according to claim 1 wherein said alumina powder has a median particle size less than about 2 microns.

10. A method according to claim 9 wherein said alumina powder has a median particle size less than about 0.58 microns.

11. A method according to claim 1 further including the step of applying pressure to said powder of at least about 2 MPa (280 PSI) to about 12 MPa (1700 PSI) for about 2 minutes prior to step (b).

12. A method according to claim 11 wherein said chamber of said vacuum hot press is maintained at a pressure of about $10^{-2}$ to $10^{-4}$ torr.

13. A method according to claim 12 wherein said chamber of said vacuum hot press is maintained at a pressure of about $10^{-4}$ to about $10^{-6}$ tort.

14. A method according to claim 1 wherein said vacuum hot pressing temperature is about 1375° C. to about 1425° C.

15. A method according to claim 14 wherein said vacuum hot pressing temperature is about 1400° C.

16. A method according to claim 11 wherein said vacuum hot pressing pressure is greater than about 28 MPa (4000 PSI).

17. A method according to claim 16 wherein said vacuum hot pressing pressure is greater than about 31 MPa (4500 PSI).

18. A method according to claim 17 wherein said vacuum hot pressing pressure is greater than about 34.5 MPa (5000 PSI).

19. A method according to claim 1 wherein said vacuum hot pressing time is greater than about 2.0 hours.

20. A method according to claim 19 wherein said vacuum hot pressing time is greater than about 2.5 hours.

21. A method for producing a high strength alumina material in a vacuum hot press having a chamber including a die cavity comprising the steps of:
   (a) introducing an alumina powder containing at least about 99.5% alumina, substantially free of sintering agents, and having a median particle size less than about 2 microns, into the die cavity;
   (b) evacuating said chamber to a pressure in the range of about $10^{-2}$ to about $10^{-4}$ torr;
   (c) vacuum hot pressing said powder at a temperature of about 1375° C. to about 1425° C., at a die pressure greater than about 28 MPa (4000 PSI), and for about 2.0 hours to produce a high strength alumina material; and
   (d) treating the material from step (c) in a hot isostatic press operated at a pressure, at a temperature, and for a time period sufficient to obtain substantially consistent densification throughout said alumina material, but below a temperature and for a shorter period than that which can cause substantial grain growth, and under an inert gas atmosphere.

22. A method according to claim 21 wherein said alumina powder is at least about 99.5% alumina.

23. A method according to claim 21 wherein said alumina powder is at least about 99.9% alumina.

24. A method according to claim 23 wherein said alumina powder is at least about 99.99% alumina.

25. A method according to claim 24 wherein said alumina powder has a median particle size less than about 0.58.

26. A method according to claim 25 wherein said chamber is evacuated to a pressure in the range of at least about $10^{-4}$ to about $10^{-6}$ torr.

27. A method according to claim 26 wherein said vacuum hot press sintering temperature is about 1400° C.

28. A method according to claim 27 wherein said vacuum hot press die pressure is at least about 31 MPa (4500 PSI).

29. A method according to claim 28 wherein said vacuum hot press die pressure is at least about 34.5 MPa (5000 PSI).

30. A method according to claim 29 wherein said vacuum hot pressing time is abut 2.5 hours.

31. A method according to claim 30 wherein said hot isostatic press is operated at a pressure of at least about 138 MPa (20,000 PSI), at a temperature of about 1275° C. to about 1400° C. but below a temperature which would cause substantial grain growth, for about 1.5 hours to about 2.25 hours but for a shorter period than would cause substantial grain growth, and under an inert gas atmosphere.

32. A method according to claim 31 wherein said hot isostatic press is operated at a pressure of at least about MPa (25,000 PSI), at a temperature of about 1300° C., and for about 2 hours.

33. A method according to claim 32 including the step of calcining said powder at a temperature sufficient to remove volatile contaminants prior to step (a).

34. A method according to claim 33 including the step of applying a pressure to said powder of at least about 2 MPa (280 PSI) to 12 MPa (1700 PSI) for about 2 minutes prior to step (b).

35. A method according to claim 21 including the step of calcining said powder at a temperature sufficient to remove volatile contaminants prior to step (a).

36. A method according to claim 21 including the step of applying pressure to said powder of at least about 2 MPa (280 PSI) to at least about 12 MPa (1700 PSI) for about 2 minutes prior to step (b).

* * * * *

UNITED STATES PATENT AND TRADEMARK OFFICE
CERTIFICATE OF CORRECTION

PATENT NO. : 5,443,773
DATED : August 22, 1995
INVENTOR(S) : James M. Staehler, et al.

It is certified that error appears in the above-indentified patent and that said Letters Patent is hereby corrected as shown below:

Column 5, line 8, "(25,009 PSI)" should be --(25,000 PSI)--; and line 9, "1209°" should be --1200°--.

Column 8, line 19, "11" should be --1--;

line 30, "11" should be --1--; and line 67, "21" should be --22--.

Column 10, line 7, before "MPa" insert --172--.

Signed and Sealed this

Sixteenth Day of January, 1996

Attest:

BRUCE LEHMAN

*Attesting Officer*     *Commissioner of Patents and Trademarks*